United States Patent [19]
Gleim et al.

[11] Patent Number: 5,327,410
[45] Date of Patent: Jul. 5, 1994

[54] DIRECTION-DETERMINATION LOGIC AS FOR A SIGNAL PICKUP IN RECORDED SIGNAL RECOVERY APPARATUS

[75] Inventors: Günter Gleim; Friedrich Füldner; Bernd Rekla, all of VS-Villingen-Schwenningen, Fed. Rep. of Germany

[73] Assignee: Deutsche Thomson-Brandt GmbH, Villengen-Schwenningen

[21] Appl. No.: 871,445

[22] Filed: Apr. 21, 1992

[30] Foreign Application Priority Data

Sep. 30, 1989 [DE] Fed. Rep. of Germany ....... 3932832
Sep. 20, 1990 [WO] PCT Int'l Appl. ................ 90/01594

[51] Int. Cl.$^5$ ............................................. G11B 7/00
[52] U.S. Cl. ............................... 369/44.28; 369/44.34
[58] Field of Search ............... 369/44.25, 44.26, 44.27, 369/44.28, 44.29, 32, 48, 58, 44.34; 307/445, 272.1, 272.3

[56] References Cited

U.S. PATENT DOCUMENTS 5,077,718 12/1991 Matsushita ...................... 369/44.32
5,177,719 1/1993 Yamada et al. .................. 369/44.34

FOREIGN PATENT DOCUMENTS 0183303 6/1986 European Pat. Off. .
0301644 2/1989 European Pat. Off. .
60-10429 1/1985 Japan .

*Primary Examiner*—Aristotelis Psitos
*Assistant Examiner*—Nabil Hindi
*Attorney, Agent, or Firm*—Joseph S. Tripoli; Eric P. Herrmann; Lester L. Hallacher

[57] ABSTRACT

Direction determining logic for a regulation circuit which guides a detection device along the data tracks of a recording medium receives an HF signal indicating when the detection device scans a dirty or damaged area of the recording medium, and a tracking error signal when the detection device leaves the track. The direction determining logic includes first and second multiple input terminal logic gates for respectively providing first and second complimentary output signals. A bistate logic circuit is selectively responsive to the HF signal and the tracking error signal and provides complementary output signals to one input terminal of each of the multiple input terminal logic gates. Other logic selectively inhibits the other input terminal of one of the multiple input terminal logic gates as the detection device scans a dirty or damaged area of the recording medium and the other of the multiple input terminal logic gates when the tracking device leaves the track.

8 Claims, 7 Drawing Sheets $HF = AS + BS + CS + DS$
$FE = (AS + CS) - (BS + DS) = 0$
$TE = ES - FS = 0$ $FE = (AS + CS) - (BS + DS) = 0$
$TE = ES - FS < 0$

DIRECTION-DETERMINATION LOGIC AS FOR A SIGNAL PICKUP IN RECORDED SIGNAL RECOVERY APPARATUS

This is a continuation of PCT application PCT/EP 90/01594 filed Sep. 20, 1990 by Gunter Gleim, Friedrich Fuldner, and Bernd Rekla and titled "Direction-Determination Logic" published Mar. 12, 1993.

This invention can be used with the invention described in application Ser. No. (RCA 86,783) corresponding to U.S. Ser. No. 07/871,444 filed Apr. 21, 1992 by Gunter Gleim, Friedrich Fuldner and Bernd Rekla and titled "Detector Circuit", which application is a continuation of PCT application PCT/EP 90/01595, filed Sep. 20, 1990.

This invention can be used with the invention described in application Ser. No. (RCA 86,785) corresponding to U.S. Ser. No. 07/871,442 filed Apr. 21, 1992 now U.S. Pat. No. 5,313,40 by Gunter Gleim, Friedrich Fuldner and Bernd Rekla and titled "Counter", which application is a continuation of PCT application PCT/EP 90/01599, filed Sep. 20, 1990.

The invention is directed to a method of determining the direction of travel of a scanner across markings, or data tracks, on a recording medium in which a first error signal and a second error signal, shifted in phase from the first error signal, is generated. CD players, video disk players, DRAW disk players or magneto-optical recording and playback apparatus, for example, are equipped with a track regulation circuit and an optical scanning device.

The construction and function of an optical scanning device, a so-called optical pick-up, are described in Electronic Components & Applications, Vol. 6, No. 4, 1984, on pages 209 through 215. Lenses focus a light beam emitted from a laser diode onto a compact disk, which reflects the beam onto a photodetector. The information stored on the disk, and the actual values for the focusing and tracking circuits are obtained from the signal reflected from the detector. The referenced article calls the deviation of the focusing-circuit actual value from its reference value the focusing error, and the deviation of the tracking-circuit actual value from its reference value the radial tracking error.

The focusing circuit is adjusted with a coil having an object lens which moves along an optical axis through the magnetic field of the coil. The focusing circuit moves the lens back and forth to maintain the light beam from the laser diode focused on the compact disk. The tracking circuit, which is often called the radial drive mechanism, moves the optical pickup radially over the disc. The radial-drive mechanism in some equipment includes a coarse-driven mechanism and a fine-drive mechanism. The coarse-drive mechanism can include a spindle that shifts the overall optical pickup, consisting of a laser diode, lenses, a prismatic beam splitter, and a photodetector, back and forth radially. The fine-drive mechanism can either shift the beam of light back and forth radially or tilt it at a prescribed angle, advancing it slightly, approximately 1 ram, along a radius of the disc.

High quality reproduction, irrespective of whether the data are both picture and sound in a videodisc player, sound alone in a compact-disc player, or the data stored on a magneto-optical disc, requires precise focusing of the light beam onto the disc and also precise guidance along the data tracks of the disc.

FIGS. 1 to 4 are useful in understanding how the track of a laser scanned disc is followed. In FIG. 1, three laser beams L1, L2, and L3 are focused onto a photodetector PD in the optical pickup of a compact-disk player, the direction of motion of detector PO relative to the disc is indicated by the arrow. Beams L2 and L3 are diffraction beams of orders $+1$ and $-1$. A pickup of this type is called a three-beam pickup. The photodetector PD includes four square photodiodes A, B, C and D arrayed in the form of a larger square. A rectangular photodiode E is arranged in front of the diodes A to D and another photodiode F is arranged behind the photodiodes A to D. The middle laser beam, beam L1, is focused onto photodiodes A, B, C, and D, to generate data signal $HF = AS + BS + CS + DS$ and a focusing-error signal $FE = (AS + CS) - (BS + DS)$. The forward outer beam L3 is reflected to photodiode E and rear outer beam L2, is reflected to photodiode F. The two outer beams L2 and L3 provide signals for the generation of a tracking-error signal $TE = ES - FS$. The parameters AS, BS, CS, DS, ES, and FS are the photoelectric voltages provided by the photodiodes A, B, C, D, E, and F, respectively.

When the middle laser beam L1 is precisely at the middle of a track the tracking-error signal TE has the value zero:

$$TE = ES - FS.$$

When the middle beam moves away from the middle of the track S, one of the diffraction beams approaches the middle of the track and the other diffraction beam shines on the space between two tracks. Since, however, a track reflects differently from the space between the two tracks, one diffraction beam will be reflected more powerfully than the other.

Laser beams L1, L2, and L3 are displaced to the right of track S in FIG. 2, and the tracking-error signal assumes a negative value:

$$TE = ES - FS < 0.$$

The mechanism that adjusts the tracking circuit shifts the optical pickup to the left until tracking-error signal TE becomes zero.

In the opposite situation, when the laser beams have been displaced to the left of the track, the tracking-error signal becomes positive:

$$TE = ES - FS > 0.$$

The mechanism that adjusts the tracking circuit shifts the optical pickup to the right until the tracking-error signal becomes zero. This situation is illustrated in FIG. 3.

When middle beam L1 and its associated diffraction beams L2 and L3 cross several data tracks, tracking-error signal TE assumes the sinusoidal shape illustrated in FIG. 4.

A tracking circuit is described in Japanese Exposure 60 10429. In this tracking circuit, the lower and upper envelope of the HF signal indicates whether a beam of light is crossing any data tracks. When the beam travels over several tracks, the HF signal collapses uniformly between two tracks. The number of tracks crossed by the beam of light is determined by constructing, the envelope of the HF signal and converting the envelope into a square-wave signal that is supplied to the counting input terminal of an up-and-down counting circuit, which counts the HF breakdowns.

Direction determining logic is used to determine the direction of the radial motion of the light beam across the recording medium. This logic evaluates the phase shift between the tracking error signal TE and the envelope of the HF signal.

Patent GB-A 2 073 543 describes a tracking regulation circuit which checks whether the HF signal lies below a predetermined threshold value. When it does, dependent upon the sign of the preceding tracking error signal, either a positive or a negative voltage is applied to the control unit of the optical scanner to guide the scanner onto the right data track. However, because dust, dirt, fingerprints or scratches on a CD disk can also cause a collapse of the HF signal, measures must be taken to distinguish between HF collapses caused by such conditions of the recording medium from HF collapses caused by tracking changes of the light beam.

Patent EP-A 0 183 303 describes a CD player in which the lock-in of the light spot onto a data track of the compact disk, the so-called locking-in, occurs at the point of the largest eccentricity of the disk because at this point the relative speed between the light beam and the data track is the lowest. In order to determine the number of tracks crossed by the light beam the envelope of the HF signal is generated and compared with a threshold value. The comparison of the envelope of the HF signal with the first threshold value provides a pulse shaped signal. Each pulse of this pulse shaped signal indicates a change of track. In order to render the CD player more secure against so-called drop-outs—i.e. audible interference in sound reproduction due to a defective, scratched or dirty compact disk—the envelope of the HF signal can be compared with a second threshold value. A pulse is generated from the envelope of the HF signal only when the envelope exceeds both the first and the second threshold value and when the drop-out detector of the CD player is not in operation. Patent WO-A-88/09988, describes a CD player with a drop-out detector which evaluates the HF signal.

Direction determining logic is used to determine the direction of radial motion of the light beam. This logic evaluates the phase shift between the tracking error signal TE and the envelope of the HF signal. Depending upon the direction of motion of the light beam the phase shift is either +90 degrees or −90 degrees. However, as explained hereinafter, these two values are valid only for relatively low speeds of the light beam.

A square-shaped tracking error signal is generated from the sinusoidal tracking error signal TE by means of an RC network. The RC time constant is therefore the same value for the rising and falling sides. However, because a square-shaped envelope signal is obtained from the envelope of the HF signal, by means of an RC network and through subsequent peak value rectification, the time constants for the rising and falling sides have different values. This difference increases with the speed of the light beam across the record.

In putting the tracking error signal TE to the D input of a D-type flipflop and the envelope of the HF signal to its clock input is known. Thus, the D flipflop receives a pulse on its clock input terminal when the light beam crosses a data track. Since the preceding sign of the tracking error signal TE is dependant upon the direction in which the light beam leaves a data track, the D flipflop output is high for one direction and low for the other direction. Therefore, the signal at the Q output terminal of the D flipflop can be used to set the counting direction counter. There is a disadvantage of high search speeds when the light beam moves rapidly across the tracks. The phase shift between the envelope of the HF signal and the tracking error signal, is no longer +90 degrees or −90 degrees because of the differences in the time constants. Therefore, the phase shift is undefined and the direction of motion of the light can no longer be determined at high speeds.

Also, the square-shaped signal generated from the envelope of the HF signal is also afflicted with bounce pulses, and anti-beating measures therefore must also be taken.

It is therefore the object of the invention to provide direction determining logic which indicates the direction a scanner travels across markings or crosses data tracks on a recording medium. The invention achieves this objective by the provision of determining logic which evaluates the phase shift between a first error signal and a second error signal only when the speed at which the scanner travels across the disc is below a predetermined threshold value.

The invention is based upon the knowledge that the speed of the scanning light beam cannot change rapidly. When the light beam is moved across the tracks its speed does not rise suddenly but, rather rises continuously from zero to the highest value. Therefore, initially in the movement the phase shift between the pulse shaped tracking error signal TZ and the pulse shaped envelope signal HP is +90 degrees or −90 degrees, depending upon the direction of motion. When the speed of the light beam becomes sufficiently high the edges of the pulse shaped envelope signal HP and the pulse shaped tracking error signal TE no longer occur in an alternating sequence. Under the condition the direction determining logic RL maintains the last determined direction. However, the light beam motion cannot change directions without becoming zero and the edges of the pulse shaped envelope signal tip and the pulse shaped tracking error signal again occur in alternating fashion. The phase shift again becomes +90 degrees or −90 degrees. The direction determining logic RL again evaluates the phase shift and is able to establish the direction of movement of the light beam. When the light beam motion reverses direction, the sign of the phase shift is also reversed and the direction determining logic RL recognizes the change in the direction of motion.

When the light beam moves in one direction every rising pulse edge of the envelope signal HP is followed by a falling pulse edge of the tracking error signal TZ. Thus, an edge of one type in one signal is followed by an edge of the opposite type in the other signal. However, for the other motion direction an edge of the envelope signal HP is followed by the same type of edge of the tracking error signal TZ. When the speed of the light beam increases to the speed where the edges of the envelope signal HP and the tracking error signal TZ no longer occur alternatingly the direction determining logic maintains the existing direction.

Figure 1:
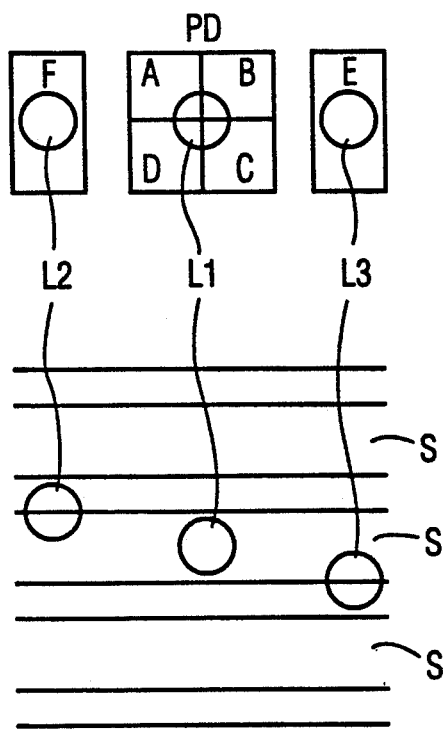
FIGS. 1 to 4 show how a laser beam tracks a record groove.
Figure 2:
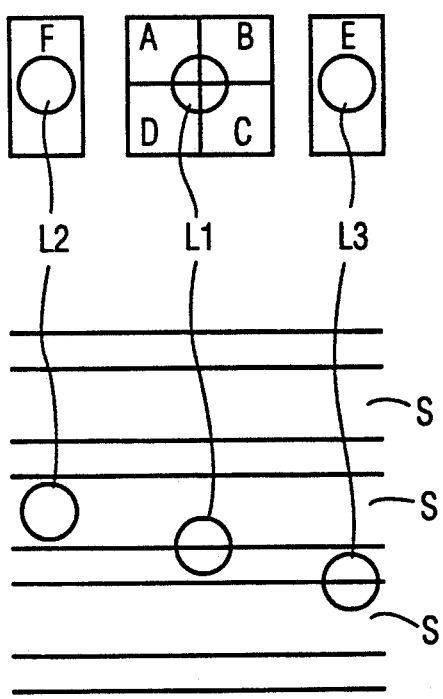
Figure 3:
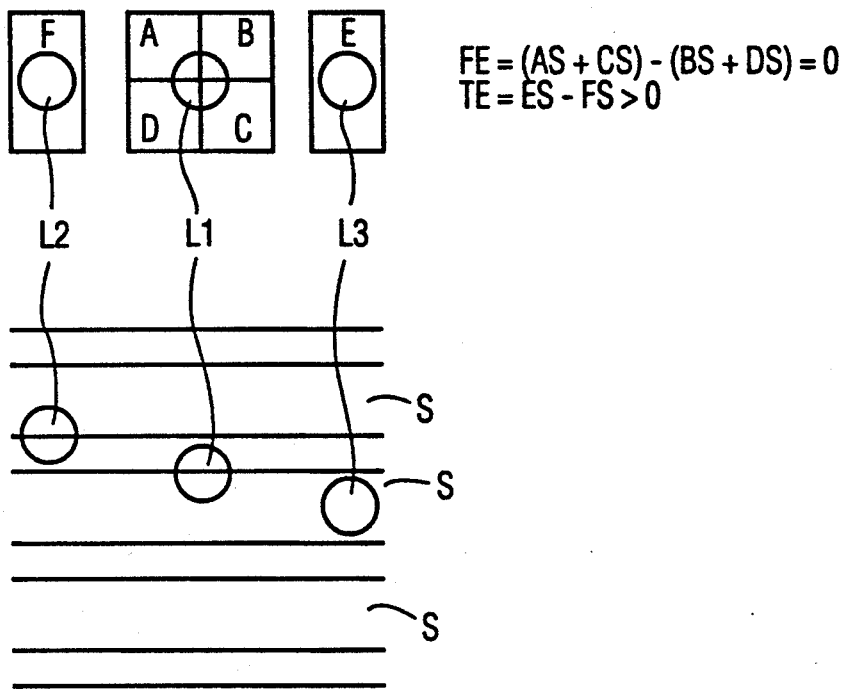
Figure 4:
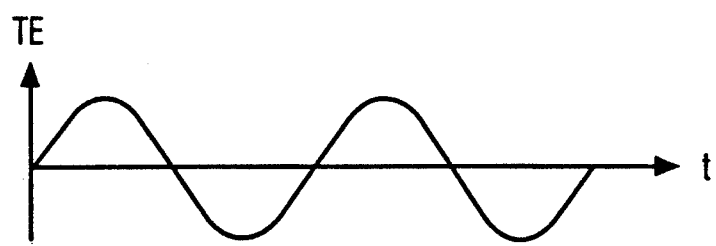
Figure 5:
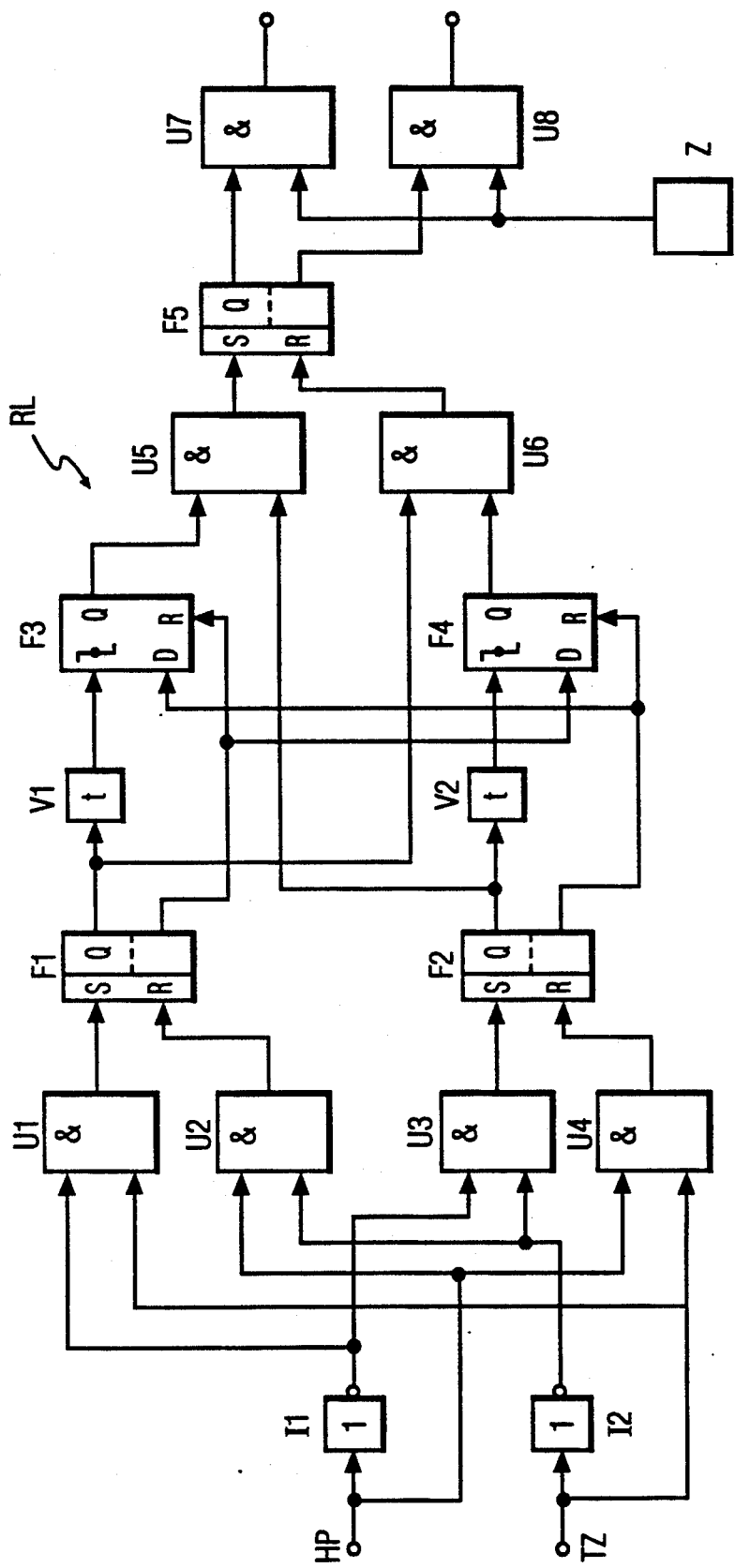
FIG. 5 is a first preferred embodiment.

The direction determining logic is designated as RL in FIG. 5, the detection circuit, which indicates when the light beam crosses a track, is designated Z. The output of an inverter I1 is coupled to the first input terminals of AND gates U1 and U3. The input terminal of the inverter I1 is coupled to the first input terminals of AND gates U2 and U4. The output terminal of an inverter I2 is coupled with the second input terminals of AND gates U2 and U3. The input terminal of the inverter I2 is coupled to the second input terminal of AND gates U1 and U4. The output terminal of the AND gate U1 is coupled to the input terminal of an RS flipflop F1, the reset input terminal of which is coupled to the output terminal of the AND gate U2. The output terminal of the AND gate U3 is coupled to the set input terminal of an RS flipflop F2, the reset input terminal of which is coupled to the output terminal of the AND gate U4. The Q output terminal of the RS flipflop F1 is coupled to the first input terminal of an AND gate U6 and, via a delay element V1, to the clock input terminal of a D flipflop F3, the Q output terminal of which is coupled to the first input terminal of an AND gate U5. The Qbar output terminal of the RS flipflop F1 is coupled to the reset input terminal of the D flipflop F3, and to the data input terminal of a D flipflop F4, the Q output terminal of which is coupled to the second input terminal of the AND gate U6. The Q output terminal of the RS flipflop F2 is coupled to the second input terminal of the AND gate U5 and, via a delay element V2, to the clock input terminal of a D flipflop F4, the reset input terminal of which is coupled to the Qbar output terminal of the RS flipflop F2 and to the data input terminal of the D flipflop F3. The output terminal of the AND gate U5 is coupled to the set input terminal of an RS flipflop F5, the reset input terminal of which is coupled to the output terminal of the AND gate U6. The Q output terminal of the RS flipflop F5 is coupled to the first input terminal of an AND gate U7, and the Qbar output terminal with the first input terminal of an AND gate U8. The output terminal of a detection circuit Z is coupled to the second input terminal S of the AND gates U7 and U8.

The input terminal of the inverter I1 receives the envelope signal HP. The input terminal of the inverter I2 receives the tracking error signal TZ. The RS flipflop F5 outputs a logic 1 at its Q output terminal when the light beam crosses tracks in one direction and a logic zero when the light beam crosses tracks in the other direction. The detection circuit Z determines when the light beam leaves a track and provides a logic one at its output terminal when the light beam is reflected from a space between two tracks, the technical term for this being "lawn". When the light beam is reflected from a track a logic zero is present at the output terminal of the detection circuit Z. A circuit which can be used as the detection circuit Z is described in application Ser. No. (RCA 86,783) fully reference hereinabove. The AND gates U7 and U8 are therefore inhibited when the light beam is reflected from a track. The AND gate U7 outputs a counting pulse when the light beam crosses a data track on the recording medium in one direction and the AND gate U8 outputs a counting pulse when the light beam crosses a data track in the opposite direction. The counting pulses at the output of the AND gate U7 can be fed to an up counter or to the up count input terminal of an up-down counter. The counting pulses at the output of the AND gate U8 are fed to a down counter or to the down counting input terminal of an up-down counter. A counter which can be used for the up-down counter is described in application Ser. No. (RCA 86,785) fully referenced hereinabove.

When the speed of the light beam increases to the speed where the edges of the pulse shaped envelope signal HP and of the pulse shaped tracking error signal TZ no longer appear in an alternating sequence the RS flipflop F5 maintains its existing state and remains either set or reset. Thus, the RS flipflop F5 changes its state when the succession of edges of the pulse shaped envelope signal HP and of the pulse shaped tracking error signal TZ changes. If several edges of the same signal occur in a sequence then the RS flipflop F5 does not change its state.

Figure 6:
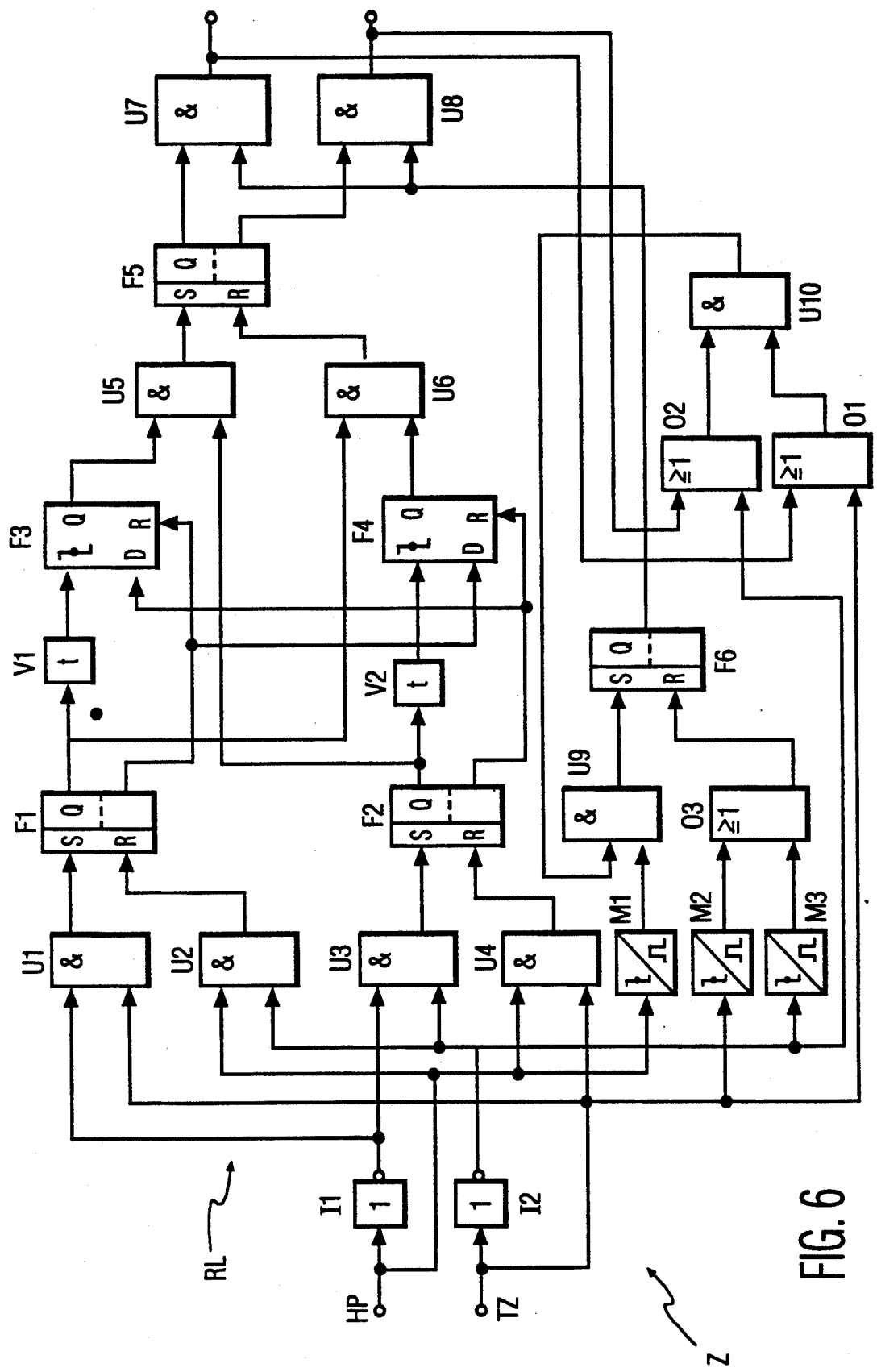
FIG. 6 is a second preferred embodiment.

The second exemplary embodiment illustrated in FIG. 6 shows the details of the detection circuitry "Z". The circuitry "Z" is arranged to conserve circuitry by utilizing elements common to the circuitry RL.

The pulse shaped envelope signal HP is applied to the input of a monoflop M1 triggerable by descending signal transitions the output of which is coupled with the first input of an AND gate U9. The pulse shaped tracking error signal TZ is applied to a monoflop M2 also triggerable with descending signal transitions and to the first input of an OR gate 01. The inverted pulse shaped tracking error signal $\overline{TZ}$ is applied to a monoflop M3 triggerable by ascending signal transitions and to the first input of an OR gate 02. The outputs of the monoflops M2 and M3 are coupled with the inputs of an OR gate 03 the output of which is coupled to the reset input of an RS flipflop F6. The output of the AND gate U9 is coupled with the set input of the RS flipflop F6. The outputs of the OR gates 01 and 02 are coupled with the inputs of an AND gate U10 and the output of which is coupled to the second input of the AND gate U9. The output of the AND gate U8 of the direction determining logic RL is coupled to the second input of the OR gate 02, the output of the AND gate U7 with the second input of the OR gate 01. The Q output of the RS flipflop F6, the output of the detection circuit Z, is coupled to the second input of the AND gates U7 and U8.

Figure 7:
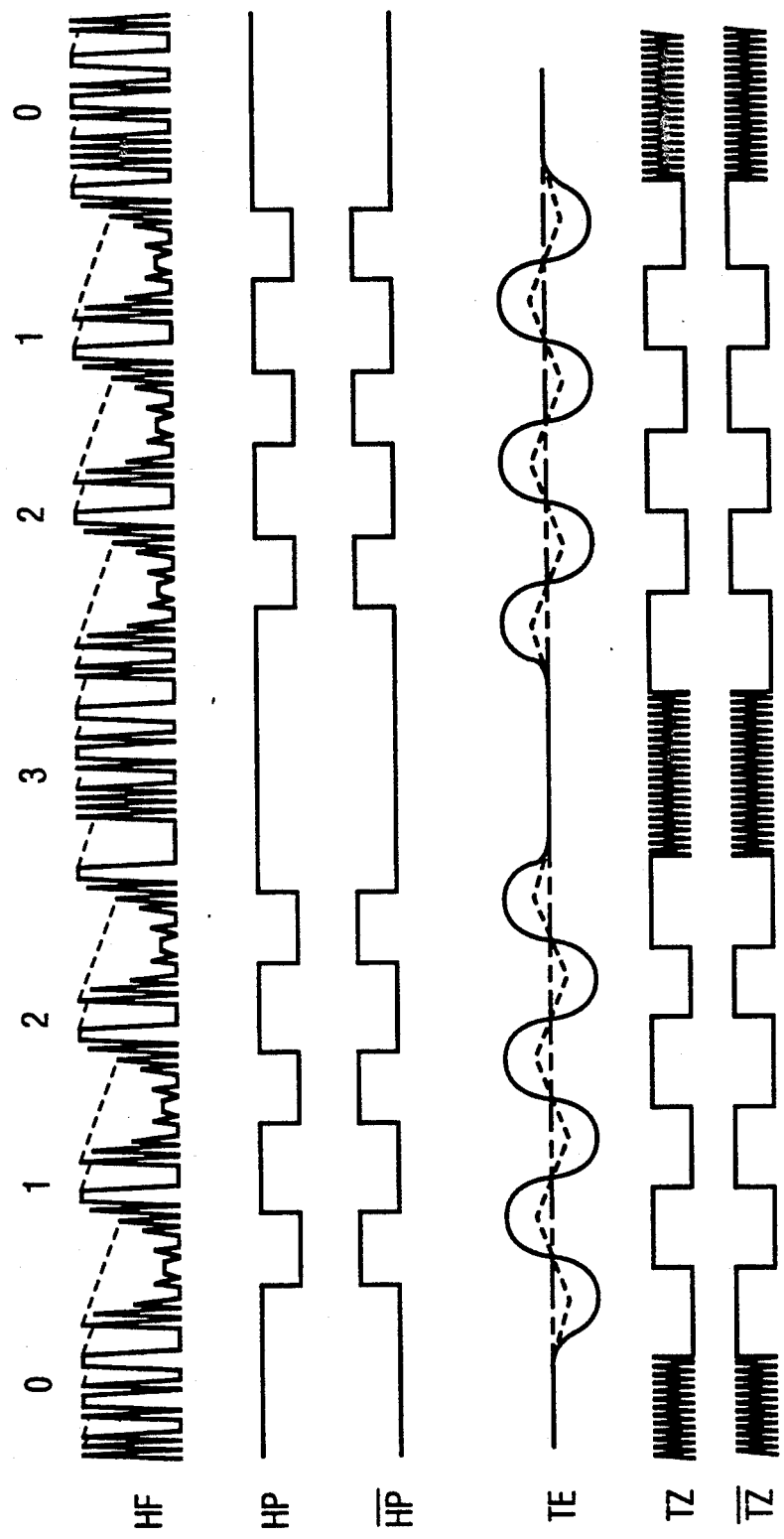
FIGS. 7, 8 and 9 are waveforms illustrating the operation of the invention.
Figure 8:
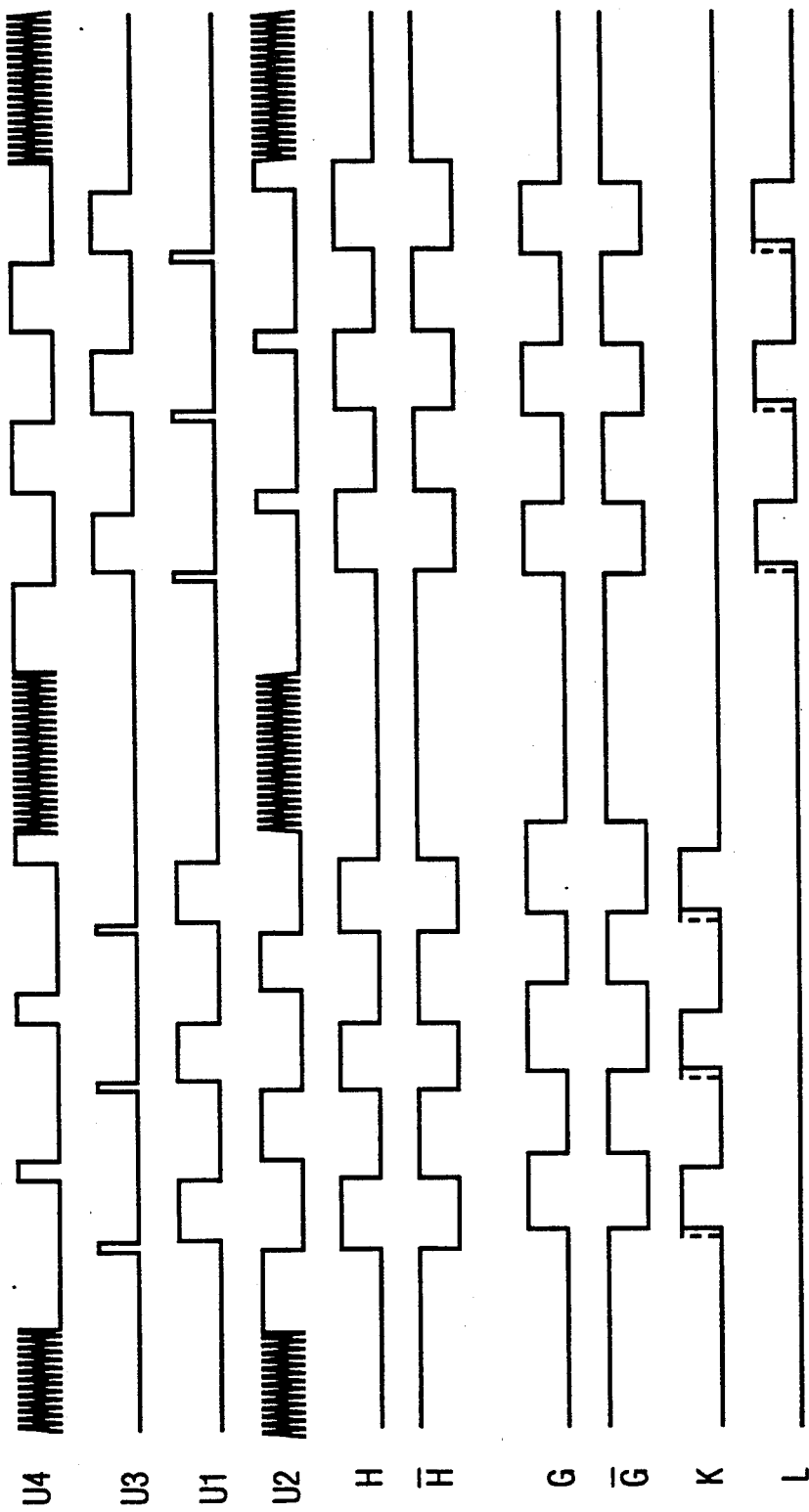
Figure 9:
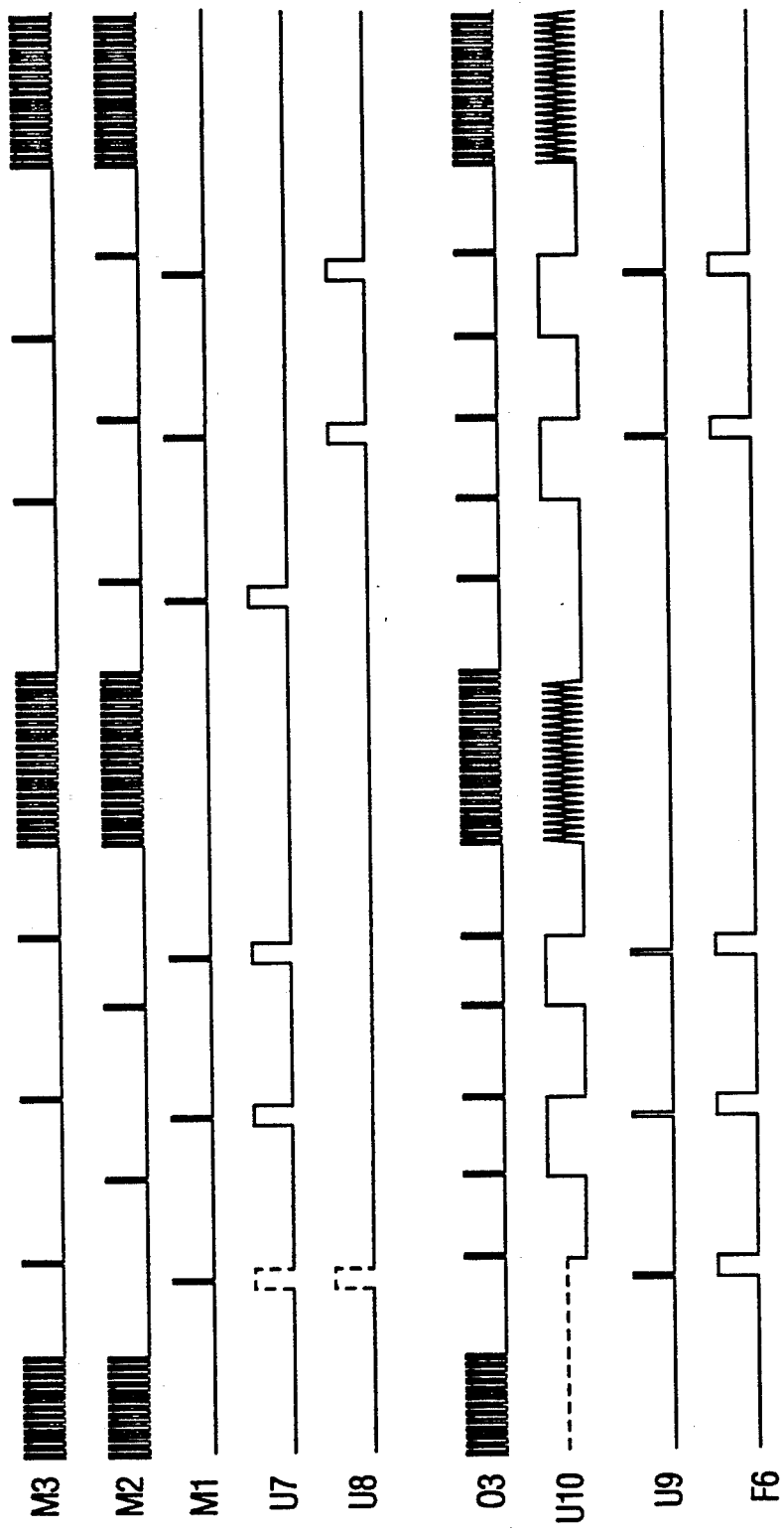

The functionality of the first and second embodiments are illustrated by means of the pulse diagrams shown in the FIGS. 7, 8 and 9.

In FIG. 7 the signal HF, recovered from the disc, is shown with an indication (by virtue of the sequence of numbers immediately over the waveform HF),that the pickup light beam runs from the track 0 across the tracks 1 and 2 to the track 3 and then it reverses direction and returns to the track 0 crossing the tracks 2 and 1.

The signals HP, $\overline{HP}$, TZ and $\overline{TZ}$ are logically combined in the AND gates U1, U2, U3 and U4. The signals at the outputs of the AND gates U1, U2, U3 and U4 resulting from the logical combination, which signals are still contaminated with bounce pulses (i.e. the serrated sections of signal), are designated U1, U2, U3 and U4 in the pulse waveforms of FIG. 8. Responsive to these signals the RS flipflop F1 produces the signal H at its Q output terminal and produces the signal $\overline{H}$ at its $\overline{Q}$ output terminal. The signal at the Q output of the RS flipflop F2 is designated G, the one at the $\overline{Q}$ output is designated $\overline{G}$. The signal K is generated at the Q output of the D flipflop F3 from the bounce-free signals H, $\overline{H}$, G and $\overline{G}$, and the signal L is formed at the Q output of the D flipflop F4 from the signals H, $\overline{H}$, G and $\overline{G}$. The signals at the outputs of the monoflops M1, M2 and M3 which react to the bounce pulses in the signals TZ, $\overline{TZ}$ and HP are designated in the FIG. 9 by the same letters as the monoflops. The signals at the AND gates U7, US, U9 and U10, at the OR gate 03 as well as at the RS flipflop F6 are also designated by the same letters as the associated components in the diagram of FIG. 9.

The invention can be fabricated using I²L technology and is also useful with counting devices for counting markings, or with regulation loops for positioning a unit by the scanning of markings. The type of scanning, mechanically or contact-less, is of no relevance. The invention is particularly suited for track regulation circuits such as those found in CD players, video disk players, DRAW disk players or magneto-optical apparatus.

We claim:

1. In apparatus for recovering signal from a recorded medium, circuitry to control the guidance of a detection device along tracks of said recorded medium comprising:

a source of bilevel tracking error signal;
a source of a bilevel representation of the envelope of signal recovered from said recorded medium;
a source of signal indicating when said detection device crosses said tracks;
logic circuitry, responsive to said bilevel tracking error signal and said bilevel representation of the envelope, for generating a direction signal having first and second states for indicating the direction of track crossings of said detection device, said logic circuitry arranged to detect the direction of track crossings only when track crossings occur at a rate less than a predetermined rate, and to maintain the one of said first and second states last exhibited when said rate of track crossings exceeded said predetermined rate, said logic circuitry including;
first circuitry for producing a signal representative of the portions of said bilevel representation of the envelope when transitions of said bilevel representation of the envelope alternate with transitions of said bilevel tracking error signal;
second circuitry for producing a signal representative of the portions of said bilevel tracking error signal when occurrences of transitions of said bilevel representation of the envelope alternate with occurrences of transitions of said bilevel tracking error signal; and
a bistable circuit responsive to said signal representative of portions of said bilevel tracking error signal and said signal representative of the portions of said bilevel representation of the envelope for producing said direction signal.

2. The apparatus set forth in claim 1 further including circuitry for combining said direction signal and said track crossing signal.

3. The apparatus set forth in claim 2 wherein said bistable circuit provides first and second complementary signals and said circuitry for combining said direction signal and said track crossing signal comprises first and second AND circuits having first input terminals coupled respectively to said first and second complementary signals and having second input terminals coupled to said source of track crossing signal.

4. The apparatus set forth in claim 3 wherein said bistable circuit is conditioned by said first and second circuitry to provide a signal exhibiting a first state when a transition of said bilevel representation of the envelope is followed by a transition of said bilevel tracking error signal of opposite direction, and to provide a signal exhibiting a second state when transitions of said bilevel tracking error signal are followed by respective transitions of said bilevel representation of the envelope of like direction.

5. The apparatus set forth in claim 1 wherein said first circuitry comprises:

first and second invertors for complementing said bilevel tracking error signal and said bilevel representation of the envelope of signal recovered from said recorded medium respectively;
a set-reset flip-flop;
means responsive to said bilevel tracking error signal and said bilevel representation of the envelope and their respective complements for generating a set signal exhibiting a first state only when said tracking error signal exhibits a first state and said bilevel representation of the envelope exhibits said second state, and for generating a reset signal exhibiting said first state only when said tracking error signal exhibits said second state and said bilevel representation of the envelope exhibits said first state; and
means for coupling said set and reset signals to respective set and reset input terminals of said set-reset flip-flop.

6. The apparatus set forth in claim 5 wherein said second circuitry includes circuitry similar to said first circuitry including said set-reset flip-flop, the set-reset flip-flop of said second circuitry providing an intermediate output signal, and wherein said first circuitry further comprises:

a D-type latch having a data input terminal, a clock input terminal and an output terminal;
means for coupling said clock input terminal to an output of said set-reset flip-flop of said first circuitry;
means for coupling said intermediate output signal to said data input terminal; and
means for coupling the output terminal of said D-type latch to said bistable circuit.

7. The apparatus set forth in claim 1 further including circuitry for combining said direction signal and said track crossing signal.

8. The apparatus set forth in claim 7 wherein said bistable circuit provides first and second complementary signals and said circuitry for combining said direction signal and said track crossing signal comprises first and second AND circuits having first input terminals coupled respectively to said first and second complementary signals and having second input terminals coupled to said source of track crossing signal.

* * * * *